United States Patent
Hale et al.

[15] 3,656,102
[45] Apr. 11, 1972

[54] VEHICULAR ANTITHEFT DEVICE HAVING RELAY SWITCHES FOR INTERRUPTING INDUCTION COIL CIRCUIT AND FOR ACTIVATING AN ALARM

[72] Inventors: David A. Hale, 5222 Dowler Avenue, Pine Lawn, Mo. 63121; Earl R. Housman, 5814 Dressell Avenue, St. Louis, Mo. 63120

[22] Filed: June 1, 1970

[21] Appl. No.: 42,235

[52] U.S. Cl. ................................. 340/64, 180/114, 340/63
[51] Int. Cl. ................................................ B60r 25/04
[58] Field of Search ........................... 340/64, 63; 180/114; 307/10 AT

[56] References Cited

UNITED STATES PATENTS 3,343,625  9/1967  Scheuermann ..................... 307/10 AT
3,430,058  2/1969  Yoshida ................................. 340/64
3,439,771  4/1969  Commins ............................... 180/114

Primary Examiner—John W. Caldwell
Assistant Examiner—Glen R. Swann, III
Attorney—Gravely, Lieder & Woodruff

[57] ABSTRACT

An antitheft device for automobiles and similar vehicles includes a pair of relay switches, one of which breaks the ignition circuit on both sides of the induction coil when the ignition switch is open. The other relay switch connects the battery with an alarm device whenever the circuit to the induction coil is disrupted either by severing the wires leading to the coil or by placing the coil at the same potential as the battery. The other relay switch also connects the alarm with an auxiliary battery whenever the automobile battery is disconnected from the ignition system. Thus, the antitheft device signals an alarm and renders the ignition system inoperative whenever a thief attempts to run a jumper wire from the battery to the induction coil. It also signals an alarm whenever the thief attempts to remove the battery.

8 Claims, 1 Drawing Figure

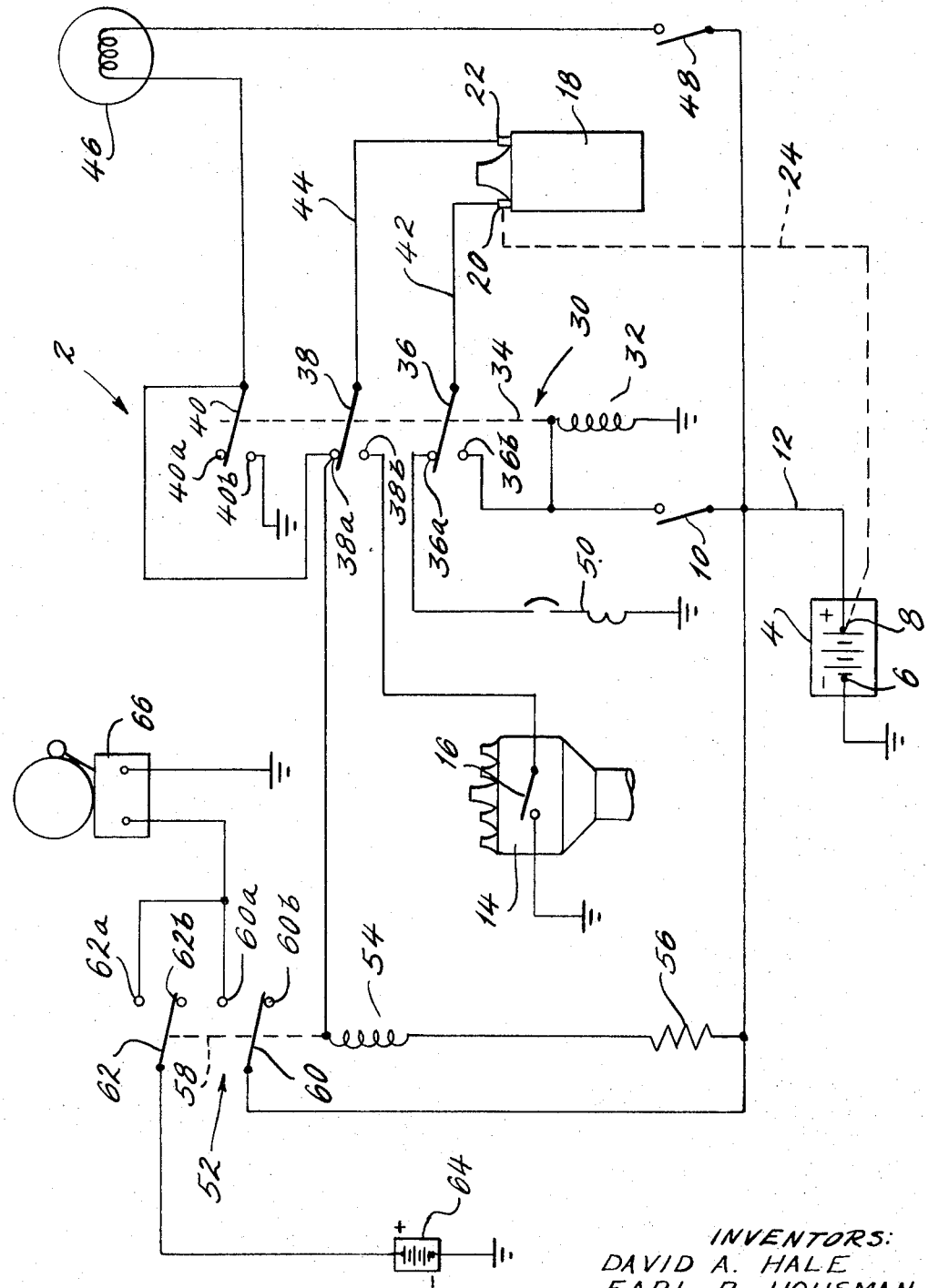
INVENTORS:
DAVID A. HALE
EARL R. HOUSMAN
BY Gravely, Lieder & Woodruff
ATTORNEYS.

VEHICULAR ANTITHEFT DEVICE HAVING RELAY SWITCHES FOR INTERRUPTING INDUCTION COIL CIRCUIT AND FOR ACTIVATING AN ALARM

BACKGROUND OF THE INVENTION

The invention relates in general to vehicles, and more particularly to an antitheft device for vehicles having spark ignition engines.

The incidence of automobile thefts has increased considerably in recent years, and this increase is partially attributable to the relative ease with which automobiles may be started and operated without their ignition switch keys. The common procedure for starting an automobile involves simply lifting the hood, running a wire from the so-called hot terminal of the battery to the primary winding of the induction coil, and then shorting out the terminals of the starter solenoid with a pliers. Thus, the thief from within the confines of the engine compartment effectively bypasses both the ignition switch and the starter switch which are normally operated by the turn of a single key.

SUMMARY OF THE INVENTION

One of the principal objects of the present invention is to provide an antitheft device for rendering the ignition system of an automobile inoperative when the ignition switch is turned off so that the automobile engine cannot be operated by running a jumper wire directly from the battery to the induction coil. Another object is to provide an antitheft device of the type stated which energizes an alarm device when anyone attempts to run a wire directly from the battery to the induction coil. A further object is to provide an antitheft device of the type stated which is easily installed on automobiles of current manufacture and can be supplied in kit form. Still another object is to provide an antitheft device which renders the circuitry of an automotive ignition system difficult to trace. An additional object is to provide an antitheft device of the type stated which signals an alarm when a thief attempts to steal or otherwise disconnects the automobile's battery. These and other objects and advantages will become apparent hereinafter.

The present invention is embodied in an antitheft device including a pair of electrically operated switches. One of the switches is controlled by the ignition switch and is interposed between the breaker points and induction coil. The other switch connects an alarm with a source of electrical energy when the circuit to the induction coil is disrupted. The invention also consists in the parts and in the arrangements and combinations of parts hereinafter described and claimed.

DESCRIPTION OF THE DRAWINGS

The accompanying drawing is an electrical schematic diagram of an automotive ignition system having incorporated therein an antitheft device constructed in accordance with and embodying the present invention.

DETAILED DESCRIPTION

Referring now to the drawing, 2 designates an antitheft device which may be installed in an automotive ignition system during manufacture of the automobile or afterwards. The ignition system has the usual components including a battery 4 provided with a grounded terminal 6 and a so-called hot terminal 8, the latter of which is connected to a conventional ignition switch 10 through a wire 12. The ignition switch 10 is preferably key operated and is located within the interior of the vehicle. The ignition system also includes a distributor 14 having breaker points 16, and an induction coil 18, the primary winding of which terminates at a pair of terminals 20 and 22.

In conventional ignition systems, the terminal 20 of the induction coil 18 is connected directly with the ignition switch 10, while the terminal 22 is connected directly to the breaker points 16 in the distributor 14. Consequently, when the switch 10 is closed, the primary winding of the induction coil 18 is placed across the terminals 6 and 8 of the battery 4 through the breaker points 16, and as the points 16 open and close, a magnetic field alternately collapses and builds up in the induction coil 18.

The common procedure for stealing thieves an automobile involves nothing more than lifting the hood and connecting a thin jumper wire 24 (shown as a dotted line) between the hot terminal 8 of the battery 4 and the terminal 20 of the induction coil 18. This bypasses the ignition switch 10 located within the interior of the vehicle and places the primary winding of the coil 18 and the breaker points 16 in the distributor 14 across the terminals 6 and 8 of the battery 4. Then the thief shorts out the terminals on the solenoid switch for the starter with a heavy piece of wire or the handles of a pliers so as to energize the starter and crank the engine. Thus, it is a simple matter to steal automobiles of current manufacture.

The efforts of automobile theives are thwarted by incorporation of the antitheft device 2 into the ignition system.

The antitheft device 2 includes a relay switch 30 having a relay coil 32 connected between the ignition switch 10 and ground, so that when the switch 10 is closed the coil 32 is energized by the battery 4. The relay switch 10 further includes an armature 34 as well as three contractors 36, 38 and 40 which are physically connected to the armature 34 and shifted thereby. The contactors 36, 38 and 40 shift in unison between pairs of contacts 36a and 36b, 38a and 38b, and 40a and 40b, respectively. The armature 34 is spring biased so that the contactors 36, 38 and 40 bear against the contacts 36a, 38a and 40a when the circuit between the coil 32 and battery 4 is interrupted at the switch 10. Conversely, when the coil 32 is energized upon closure of the ignition switch 10, the armature 34 shifts and draws the contactors 36, 38 and 40 against the contacts 36b, 38b and 40b.

The contactor 36 is connected by a wire 42 to the terminal 20 of the induction coil 18, while the contactor 38 is connected by a wire 44 to the terminal 22 of that coil 18, so that the primary winding of the induction coil 18 is interposed between the contactors 36 and 38. The contact 36b like the relay coil 32 is connected directly to the ignition switch 10, whereas the contact 38b is connected to the breaker points 16 in the distributor 14. Consequently, when the ignition switch 10 is closed the contactors 36 and 38 are drawn against the contacts 36b and 38b and the primary winding of the induction coil 18 is placed in series with the breaker points 16 and the battery 4. This, of course, causes a magnetic field to build up and collapse in the induction coil 18 as the points 16 open and close.

The contactor 40 is disposed within the automobile's headlight circuit which includes headlights 46 as well as a headlight switch 48, the latter of which is connected to the hot terminal 8 of the battery 4. The contactor 40a remains isolated so that when the ignition switch 10 is open the lights will not operate. The contactor 40b, on the other hand, is grounded so that the headlights 46 will operate when the ignition switch 10 is closed, provided of course that the light switch 48 is also closed.

The contact 36a of the relay switch 30 is connected to ground through a circuit breaker 50 which preferably resets itself within a predetermined time after it is triggered. It may also be the type which is manually reset.

The contact 38a on the other hand connects with the contactor 40 and also with an alarm circuit including a double pole double throw relay switch 52 having a coil 54. In particular, one lead of the coil 54 is connected to the contact 38a while the other lead is connected to the hot terminal 8 of the battery 4 through a resistance 56. In other words, the resistance 56 is in series with the coil 54. The relay switch 52 also includes a spring biased armature 58 which is operated by the coil 54 and moves a contactor 60 between contacts 60a and 60b and another contactor 62 between contacts 62a and 62b. The armature 58 is spring biased such that the contactors 60 and 62 are urged toward the contacts 60a and 62a, respectively, but when the coil 54 is energized the armature 58 draws the contactors 60 and 62 against the contacts 60b and 62b, respectively.

The contactor 60 is connected directly to the hot terminal 8 of the battery 4 whereas the contactor 62 is connected to an auxiliary or alarm battery 64 which is substantially equal in voltage to the battery 4. Moreover, the terminal of the alarm battery 64 to which the contactor 62 is contacted possesses the same polarity as the terminal 8 of the battery 4. The opposite terminal of the alarm battery 64 is grounded. Thus, in terms of polarity, the battery 64 is oriented the same as the battery 4.

Both contacts 60a and 62a are connected together and are further connected to one terminal of an electrically operated alarm 66 such as a bell, the opposite terminal of the alarm 66 being connected to ground.

The relay switches 30 and 52, the alarm 66, the circuit breaker 50 and the auxiliary battery 64 should all be sealed in a metal box located in a portion of the car which is quite inaccessible at least for thieves. The box may be welded permanently shut or it may have a lid provided with a key-operated lock.

In normal operation, the authorized operator inserts an ignition key into the switch 10 and closes the same. This places the coil 32 of the relay switch 30 across the battery 4 and draws the armature 34 inwardly. The armature in turn draws the contactors 36, 38 and 40 against the contacts 36b, 38b and 40b, respectively. Since the contact 36b is also connected to the hot terminal 8 of the battery upon closure of the ignition switch 10, the current flows from that contact through the contactor 36 and into the wire 42. The current passes through the primary winding of the induction coil 18 and enters the wire 44 from which it is discharged into the contactor 38. The contactor 38, being in electrical contact with the contact 38b, allows the current to flow through the breaker points 16 in the distributor 14. Thus, when the ignition switch 10 is closed the breaker points 16 and primary winding of the induction coil 18 are placed in series across the battery and thereby operate in the usual manner. Accordingly, the automobile containing the antitheft device 2 may be operated when the ignition switch 10 is closed.

Also when the ignition switch 10 is closed, the energized coil 32 draws the contactor 40 against the contact 40b and places the headlight 46 and headlight switch 48 in series across the battery 4. The headlights 46 may be energized by closing the headlight switch 48.

On the other hand, once the ignition switch 10 is opened or in other words turned to its off position, the circuit containing the relay coil 32 is interrupted and the coil 32 is of course de-energized. This enables the spring which biases the armature 34 to move the contactors 36, 38 and 40 against the contacts 36a, 38a and 40a as illustrated in the drawing. In this condition, the ignition circuit between the breaker points 16 and the battery 4 is interrupted at three locations, namely at the ignition switch 10 and at the contactors 36 and 38. Consequently, if a thief connected a jumper wire 24 between the hot terminal 8 of the battery 4 and the terminal 20 or the induction coil 18, the circuit to the breaker points 16 still remains interrupted at the contactor 38 so that the requisite build-up and collapse of a magnetic field if the coil 18 does not occur.

Aside from interrupting the ignition circuit so as to render the jumper wire 24 ineffective, the contactor 38 when the ignition switch 10 is open also connects the wire 44 to the coil 54 of the relay switch 52. The contactor 36, on the other hand, connects the wire 42 with the circuit breaker 50. In the absence of a jumper wire 24, a small current will flow from the hot terminal 8 of the battery 4, through the resistance 56 and coil 54 of the relay switch 52. The current will continue through the contact 38a and contactor 38 and will flow into the primary winding of the induction coil 18 through the wire 44. The current leaves the induction coil at the terminal 20 and flows through the wire 42, contacts 36, and contact 36a to the circuit breaker 50, beyond which the current flows back into the battery 4 through ground. The size of the resistance 56 is such that only enough current flows through the coil 54 of the switch 52 to draw the contacts 60 and 62 toward and hold them against the contacts 60b and 62b, respectively. The current required to hold the contactors 60 and 62 in is indeed minimal and does not constitute an excessive drain on the battery, nor does it raise the temperature of the induction coil 18 a significant amount. Thus, the car can remain idle over long periods of time without having the battery discharge or without having the coil 18 overheat.

When a thief connects the battery terminal 8 with the induction coil terminal 20 through a jumper wire 24 relatively little resistance exists between the circuit breaker 50 and the battery terminal 8. Thus, the circuit breaker 50 receives a large surge of current and will open. When this occurs the induction coil 18 is placed at approximately the same potential as the resistance 56 and by reason of this fact no current flows through the coil 54 of the relay switch 52. Consequently, the spring which biases the armature 58 moves the contactors 60 and 62 respectively away from the contacts 60b and 62b and into engagement with the contacts 60a and 62a. When this occurs current from the battery 4 flows through the contactor 60 and contact 60a and into the alarm 66, providing a signal to any passing individual of the attempted theft. The noise emitted by the alarm 66 should be enough to discourage any thief and cause him to flee, but if he persists he still will not be able to start the engine inasmuch as the circuit between the induction coil 18 and the breaker points 16 remains interrupted at the contactor 38.

Should the thief disconnect the lead wire 12 from the battery 4 to quiet the alarm 66, it will nevertheless still remain energized, the power therefor being supplied in this instance from the auxiliary battery 64 which connects with the alarm 66 through the contactor 62. Similarly, if the thief attempts to steal the battery 4, he will have to disconnect the wire 12 from the battery terminal 8 and in so doing he will de-energize the coil 54 of the relay switch 52. This will cause the contactor 62 to drop against the contact 62a and connect the alarm 66 with the auxiliary battery 64. Accordingly, the alarm 66 will sound even for an attempted theft of the battery 4.

Should the thief become confused and connect the jumper wire 24 to the induction coil terminal 22 instead of the terminal 20 he will still place the relay coil 54 and resistor 56 at the same potential so that no current flows through either one of them. This in turn will allow the contactor 60 to drop against the contact 60a and cause the alarm 66 to sound.

This invention is intended to cover all changes and modifications of the example of the invention herein chosen for purposes of the disclosure which do not constitute departures from the spirit and scope of the invention.

What is claimed is;

1. In a vehicle having a battery, one terminal of which is grounded, an induction coil, and breaker points, an antitheft device comprising an ignition switch connected with the ungrounded terminal of the battery, a first electrically operated switch connected to and controlled by the ignition switch, the first electrically operated switch being interposed between the breaker points and the induction coil and interrupting the circuit between the breaker points and induction coil when the ignition switch is open, an electrically operated alarm, and a second electrically operated switch interposed between the ungrounded terminal of the battery and the alarm such that the alarm is placed across the battery when the second switch is closed, the first electrically operated switch placing the second electrically operated switch in a circuit with the induction coil when the ignition switch is open so that when the circuit to the induction coil is disrupted the second electrically operated switch will cause the alarm to be energized by the battery.

2. An antitheft device according to claim 1 wherein the second electrically operated switch causes the alarm to be energized whenever the circuit in which the induction coil is deposed is broken or is placed at the potential of the ungrounded terminal of the battery.

3. An antitheft device according to claim 2 wherein another battery is connected with the second electrically operated switch; and wherein the second electrically operated switch connects the other battery to the alarm when the first battery is disconnected from the antitheft device.

4. An antitheft device according to claim 2 wherein the second electrically operated switch includes a coil which is normally in series with the primary winding of the induction coil; and wherein the first electrically operated switch places the primary winding of the induction coil between ground and the coil of the second electrically operated switch when the ignition switch is open.

5. An antitheft device according to claim 4 wherein a circuit breaker is interposed between the induction coil and ground when the ignition switch is open.

6. An antitheft device according to claim 4 wherein the first electrically operated switch includes a coil which is in series between the ignition switch and ground.

7. An antitheft device according to claim 6 wherein the first electrically operated switch interrupts the circuit between the battery and breaker points on both sides of the induction coil when the ignition switch is open.

8. An antitheft device according to claim 7 wherein the first electrically operated switch interrupts the circuit to the headlights when the ignition switch is open.

* * * * *